United States Patent [19]

Bubik

[11] 4,383,807
[45] May 17, 1983

[54] TOWING VEHICLE, BOOM, WINCHING AND LIFTING APPARATUS

[75] Inventor: Leslie Bubik, Toronto, Canada

[73] Assignee: Vulcan Equipment Company, Ltd., Scarborough, Canada

[21] Appl. No.: 261,753

[22] Filed: May 8, 1981

[51] Int. Cl.³ .............................................. B60P 3/12
[52] U.S. Cl. .................................... 414/563; 254/326
[58] Field of Search ............... 212/167, 255, 259, 260, 212/264, 265, 267, 270; 254/281, 326, 327; 280/402; 414/563

[56] References Cited

U.S. PATENT DOCUMENTS

| | | |
|---|---|---|
| 2,621,803 | 12/1952 | Taylor . |
| 2,644,595 | 7/1953 | Levan . |
| 3,182,829 | 5/1965 | Wagner . |
| 3,313,432 | 4/1967 | Sheldrew . |
| 3,516,554 | 6/1970 | Nakamura . |
| 3,539,062 | 11/1970 | Allen . |
| 3,620,393 | 11/1971 | Bubik . |
| 3,719,294 | 3/1973 | Aquila . |
| 3,841,507 | 10/1974 | Barwise . |
| 3,883,020 | 5/1975 | Dehn . |
| 3,897,879 | 8/1975 | Bubik . |
| 3,924,763 | 12/1975 | Pigeon . |
| 4,000,823 | 1/1977 | Aquila . |
| 4,034,873 | 7/1977 | Haring . |
| 4,183,709 | 1/1980 | Morrow . |
| 4,202,453 | 6/1980 | Wilkes, Jr. et al. . |
| 4,238,116 | 12/1980 | Plante et al. ...................... 254/327 X |
| 4,268,213 | 5/1981 | Obbink . |
| 4,274,791 | 6/1981 | Moon . |

FOREIGN PATENT DOCUMENTS 1007039 9/1955 Fed. Rep. of Germany .

426042 4/1974 U.S.S.R. .

OTHER PUBLICATIONS

Brochure entitled Vulcan's, "Cradle Snatcher".
Brochure entitled, "Century Hydraulic Wreckers".
Brochure entitled, "Holmes . . . 600".
Brochure entitled, "Recovery Units".

*Primary Examiner*—Robert G. Sheridan
*Attorney, Agent, or Firm*—Hosier, Niro and Daleider

[57] ABSTRACT

A towing vehicle in the form of a tow truck is disclosed in combination with a novel boom, winching and lifting apparatus. The boom is pivotally mounted on a rear body of the tow truck and comprises an angled construction so that the free end of the boom is pivotable through an arcuate path from an upper position sufficient to permit conventional towing to a lower position sufficient to permit front-end winching. A winching cable is operatively associated with the free end of the boom and when the boom is positioned in its lowermost orientation the cable may extend forwardly beneath the truck for engaging a vehicle to be towed or winched in front of the truck. A belt sling assembly is mounted at the rear of the truck body and is releasably connected to the boom. A wheel lift sling assembly is connected to the boom and includes flexible sling straps depending from opposite ends of a sling support on opposite sides of the belt sling assembly. The sling straps are releasably secured to the rear of the truck body on opposite sides of the belt sling assembly so as not to interfere with the operation thereof. The belt sling assembly is pivotally mounted at the rear of the body for pivotal movement to a storage position overlying the bed so as not to interfere with operation of the wheel lift sling assembly.

8 Claims, 7 Drawing Figures

TOWING VEHICLE, BOOM, WINCHING AND LIFTING APPARATUS

BACKGROUND OF THE INVENTION

This invention relates generally to vehicle towing and winching mechanisms, and particularly to a new and improved towing vehicle in the form of a tow truck which includes a novel combination of boom structure and winching and lifting apparatus.

Towing vehicles are relatively expensive and often times are limited in use because of the employment of specialized boom, winching and lifting apparatus. Many of the problems encountered with the use of such vehicles arise from the design, position or location of the vehicle which is to be towed. Often times cars are closely parked or are immobilized at locations where it is difficult, if not impossible, to move the cars with existing equipment. Even when possible, the operation may be tedious and clumsy. It is common for cars to be parked on streets, in parking lots, or the like, so close to each other that if a car has to be removed either because of mechanical failure or because of a traffic violation or accident, a towing vehicle cannot remove the immobilized vehicle without considerable maneuvering and loss of time, if indeed the connection can be made at all.

A particular problem resides in the fact that present towing vehicles require the immobilized car to be lifted or winched only from the rear or side of the towing vehicle. That is because the winching, lifting and towing apparatus normally is mounted on the rear of the towing vehicle, normally on a rear bed. It would be highly desirable to provide means by which the towing vehicle can be simply maneuvered so that the front end thereof is near the immobilized vehicle. However, prior art equipment does not provide any means by which the immobilized vehicle can be winched or lifted from the front of the towing vehicle, except by the use of overhead boom structures which require substantial overhead clearances.

Another problem arises from the fact that prior art equipment normally utilize two different types of sling assemblies normally associated with the boom of the vehicle. One assembly comprises a "wheel lift sling" which is connected to and depends from the rear, free end of the boom. The wheel lift sling engages beneath the wheels of an immobilized vehicle whereupon the vehicle is lifted and towed by the boom, through the wheel lift sling. A second type of sling assembly is mounted directly on the rear of the towing vehicle and engages beneath the immobilized vehicle, with flexible straps or belts wrapped about the end of the immobilized vehicle to prevent damage thereto during towing. Heretofore, the use of either sling assembly has been heretofore mutually exclusive or selective. It would be highly desirable to provide a towing vehicle wherein both types of sling assemblies can be mounted on one vehicle for selective use at any time, without removing either sling assembly from the vehicle, and with neither sling assembly interfering with the operation of the other when in use.

The present invention is directed to providing a new and improved towing vehicle, boom, winching and lifting apparatus which solves the above problems and satisfies the above needs.

SUMMARY OF THE INVENTION

The present invention is directed to a new and improved towing vehicle in combination with a novel boom assembly, and in combination with winching and lifting apparatus which provide greater versatility and a wider range of use than heretofore available with present towing vehicle designs.

In the exemplary embodiment of the invention, the towing vehicle is disclosed in the form of a tow truck having a rear body. A boom assembly is mounted on the rear body for movement about a generally horizontal axis. The boom assembly comprises an angled construction including a first boom portion pivotally mounted at one end thereof to the rear body at the pivot axis. A second boom portion is rigidly fixed to the opposite end of the first boom portion and extends rearwardly therefrom at a downward angle relative thereto. The lengths of the boom portions, their relative angular disposition and the location of the pivot axis on the rear body are such as to permit the free end of the second boom portion to pivot through a substantial arcuate path from an upper point sufficient to permit the towing of lifted or raised vehicles to a lower point for front-end winching of a vehicle. A hydraulic piston and cylinder device is mounted between the boom assembly and the rear body for moving the boom assembly about the pivot axis. A winching cable is operatively associated with the free end of the second boom portion for extending forwardly beneath the tow truck for engaging a vehicle to be towed or winched in front of the tow truck. The second boom portion is of a telescoping, variable length construction. The rear bed of the tow truck is constructed with a low profile to accommodate the downward pivotal movement of the boom.

The tow truck is disclosed in combination with two different lifting apparatus in the form of sling assemblies, neither assembly having to be removed from its storage position on the truck when the other assembly is being used. More particularly, a "belt sling assembly" is mounted at the rear of the tow truck and is releasably connected to the boom. This belt sling assembly includes a rigid frame portion positionable at least in part beneath a vehicle to be towed. Flexible belts are connected between the rigid portion and the boom and are positionable about the end of the vehicle to be towed in order to prevent damage thereto. A tow bar extends from the rear of the truck and is secured to the immobilized vehicle.

A second sling assembly is connected to and depends generally from the free end of the boom assembly. This assembly will be referred to as the "wheel lift sling assembly." The wheel lift sling assembly includes a sling support or bar connected to the free end of the boom assembly, with flexible sling straps connected to and depending from opposite ends of the sling support on opposite sides of the first or belt sling assembly. Rigid cradle bars extend transversely between the lower ends of the flexible sling straps for engaging the front or rear tires of an immobilized vehicle to lift the vehicle by means of the boom for towing purposes. Means is provided for releasably securing the flexible sling straps and wheel lift bars to the rear of the towing truck on opposite sides of the belt sling assembly, with the wheel lift bars disposed therebeneath, so as not to interfere with independent use or operation of the belt sling assembly.

The belt sling assembly is pivotally mounted at the rear of the truck bed and is pivotable to a folded storage position overlying the rear body of the truck so as not to interfere with independent use or operation of the wheel lift sling assembly.

Thus, either the wheel lift sling assembly or the belt sling assembly can be utilized independently of each other without any interference and without removal of either sling assembly from the towing vehicle.

Other features and advantages of the invention will be apparent from the following detailed description taken in connection with the accompanying drawings.

DESCRIPTION OF THE DRAWINGS

The novel features of the present invention are set forth with particularity in the appended claims. The invention, however, together with its objects and advantages, may be best understood by reference to the following description taken in conjunction with the accompanying drawings, in which like reference numerals identify like elements in the figures and in which:

DETAILED DESCRIPTION OF THE INVENTION

Figure 1:
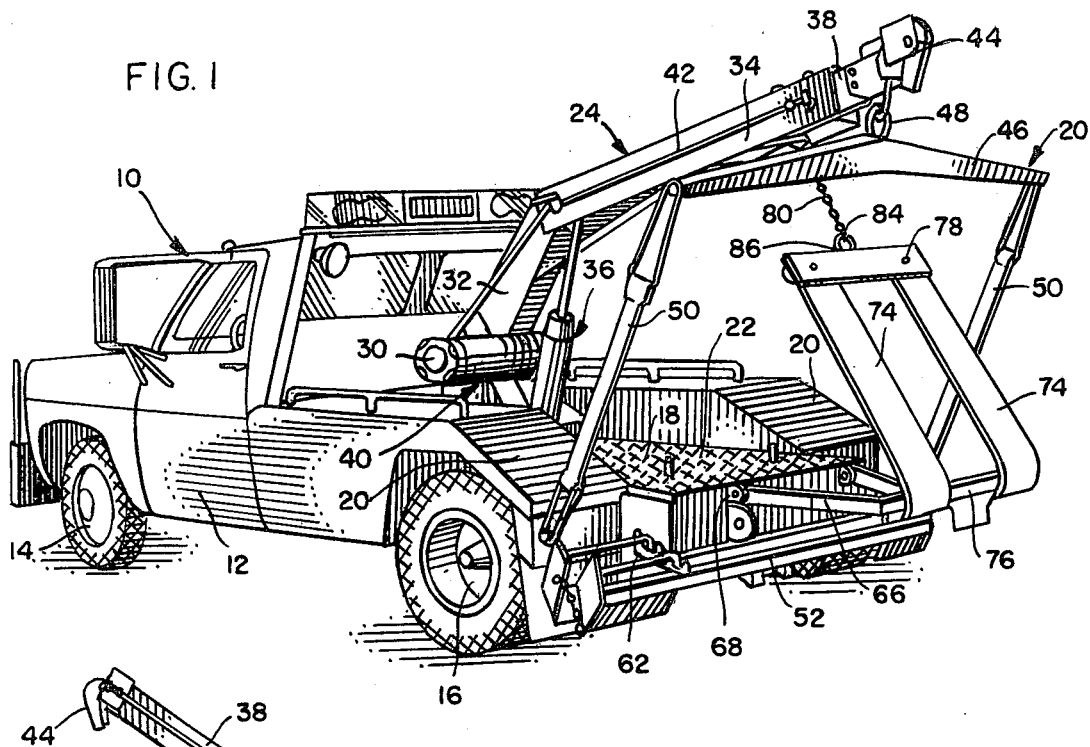
FIG. 1 is a rear perspective view of a tow truck in combination with the novel boom, winching and sling assemblies of the present invention.

The novel features of the present invention are shown in the drawings for use and in combination with a towing vehicle in the form of a tow truck. More particularly, referring first to FIG. 1, a tow truck, generally designated 10, is shown to include a cab 12, front wheels 14, rear wheels 16, and a rear body generally designated 18. At this point, it should be noted that rear body 18 is provided with a low profile at sides 20 thereof so that the weight of a towed vehicle is moved forwardly over the rear wheels 16 of the truck for maximum vehicle stability while towing. In addition, it is important to note that the rear of body 18 is recessed at the center thereof, as at 22, to accommodate folding of the belt sling assembly as will be described hereinafter.

A boom assembly, generally designated 24, is pivotally mounted on rear body 18 and is operatively associated with a wheel lift sling assembly, generally designated 26, and a belt sling assembly, generally designated 28.

Figure 2:
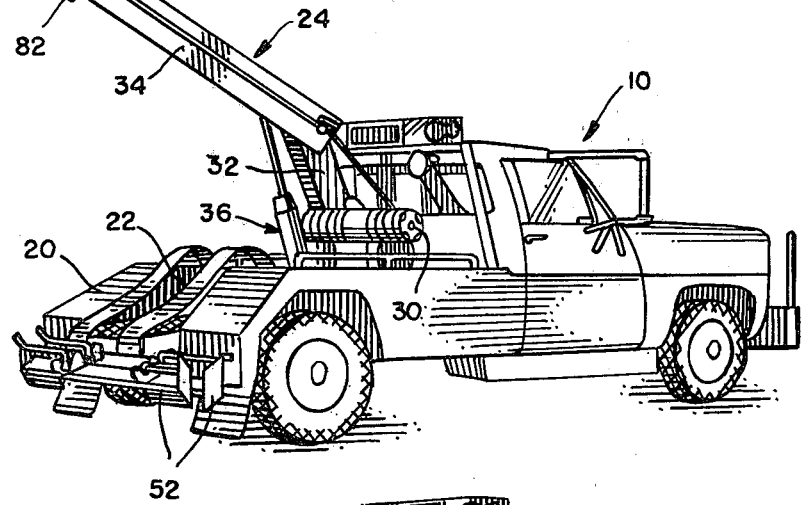
FIG. 2 is a rear perspective view of the tow truck, with the boom assembly raised and extended.
Figure 3:
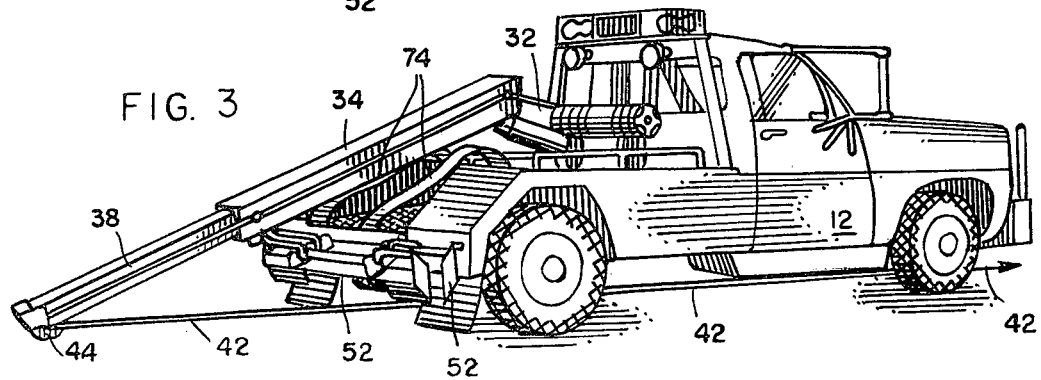
FIG. 3 is a perspective view similar to that of FIG. 2, with the boom assembly lowered and extended, and with a winching cable extending forwardly therefrom beneath the tow truck.

Referring now to FIGS. 1-3, boom assembly 24 is mounted on rear body 18 for movement about a generally horizontal axis, generally designated 30. The boom assembly comprises an angled construction which includes a first boom portion 32 pivotally mounted at one end thereof on axis 30. A second boom portion 34 is rigidly fixed to the opposite end of first boom portion 32 and extends rearwardly therefrom at a downward angle relative thereto. Power means in the form of a hydraulic piston and cylinder device, generally designated 36, is disposed between rear body 18 and second boom portion 34 for moving the angled boom assembly about axis 30. It can be seen that first boom portion 32 is shorter than second boom portion 34. With the angular boom assembly construction and the power means connected to the second or angled boom portion, a greater pivotal arc is effected without employing an unnecessarily large piston and cylinder device.

Referring particularly to FIGS. 2 and 3, second boom portion 34 is a telescoping, variable length construction which includes an extendible portion 38. Details of such a telescoping construction can be ascertained from U.S. Pat. No. 3,897,879 to the same inventor and assigned to the same assignee as the present invention, the disclosure of which is incorporated herein by reference.

Referring particularly to FIG. 3, power winch means, generally designated 40, is mounted generally adjacent the forward portion of body 18. One or more winching cables 42 are operatively associated with the power winch means and extend outwardly therefrom along the boom assembly to one or more swivel boom heads 44. The swivel boom heads are pivotally mounted on the end of the boom assembly and permit winching in directions 180° laterally outwardly from the sides of the tow truck. However, and referring particularly to FIG. 3, it can be seen that the novel angled boom assembly and tow truck combination of the present invention permits "front-end winching"; that is, cable 42 may extend forwardly beneath the tow truck for engaging an immobilized vehicle (not shown) to be winched or towed in front of the tow truck. Without the angled boom assembly construction, along with the increased pivotal arc thereof, and the low profile construction of the rear body, such front-end winching applications would not be possible, e.g. with conventional boom constructions. This is very advantageous when vehicles are immobilized in locations where it is difficult, if not impossible, to effect winching or towing of the vehicle by maneuvering the rear end of the tow truck into close proximity to the immobilized vehicle or where little overhead clearance is available such as in parking garages.

Figure 5:
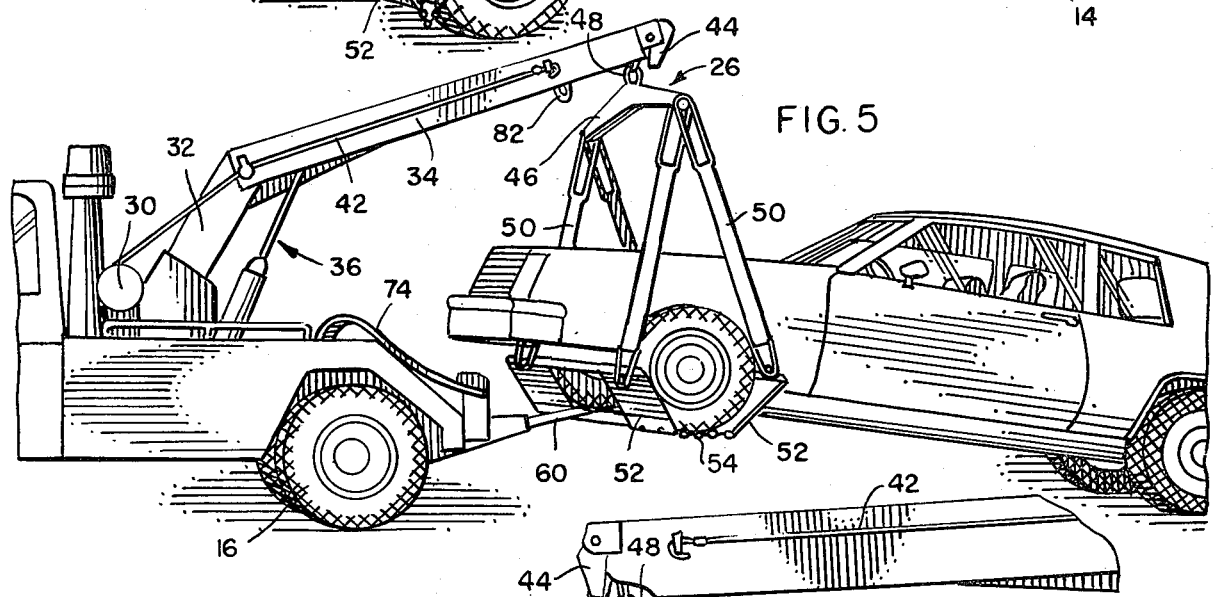
FIG. 5 is a fragmented perspective view illustrating a car in towing position, lifted by the cradle sling assembly.

Referring to FIG. 1 and FIG. 5, wheel lift sling assembly 26 includes a sling support means in the form of a rigid beam 46 connected to the free end of boom assembly 24 by means of a central eye support 48. This permits 360° swivelling of the wheel lift sling assembly, through beam 46. Two pairs of flexible sling straps 50 are connected to and depend from opposite ends of beam 46, one pair of straps at each end of the beam. A pair of wheel lift bars 52 are connected to and extend transversely between wheel lift straps 50 generally parallel to beam 46. The wheel lift bars are positionable, as seen in FIG. 5, with one bar in front of the wheels of a vehicle to be towed and with the other bar behind the wheels. Side fastening chains 54 interconnect the two wheel lift bars. A conventional adjustable length stabilizer bar 60 is releasably secured to the front wheel lift bar 52 and firmly locks the wheel lift sling assembly in position behind the tow truck, eliminating any swaying or jerking motion of the car during towing.

Referring again to FIG. 1, hook means 62 are provided at the rear of the tow truck, on opposite sides thereof, for releasably securing wheel lift bars 52, along with sling straps 50 to the rear of the truck, with the wheel lift bars disposed beneath belt sling assembly 28. This provides a storage position for the wheel lift sling assembly so as not to interfere with independent operation of the belt sling assembly, and resulting in it being unnecessary to remove the entire wheel lift sling assembly in order to utilize the belt sling assembly.

Figure 6:
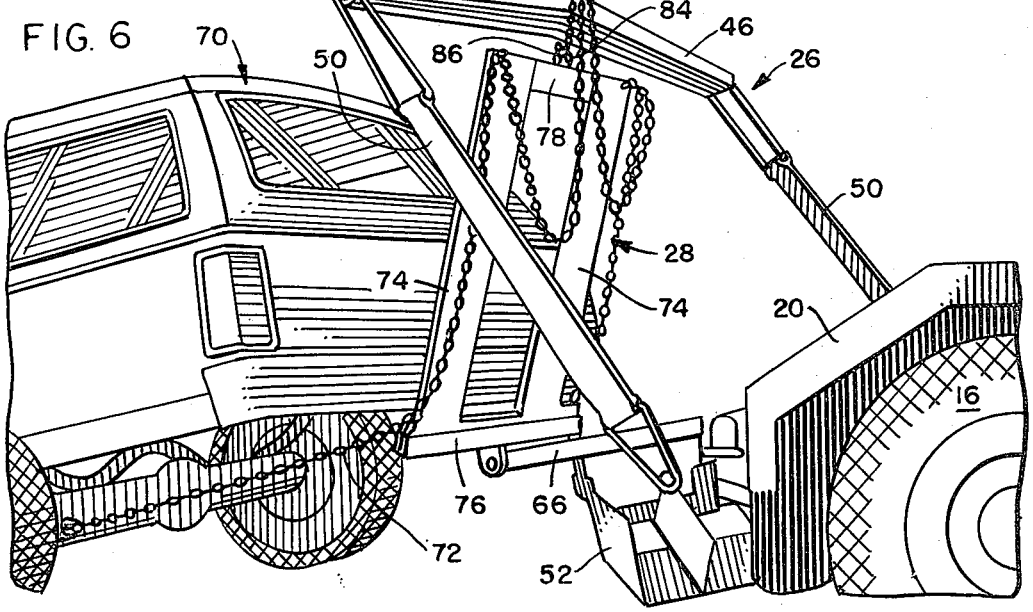
FIG. 6 is a fragmented perspective view of a van illustrated in towing position, lifted by the belt sling assembly.

Referring again to FIGS. 1 and 6, belt sling assembly 28 includes a rigid portion comprising a frame 66 pivotally mounted at the rear of the tow truck on a pivot 68 located adjacent the upper surface of rear body 18. As seen in FIG. 6, the frame is positionable at least in part beneath a vehicle, generally designated 70, which is to be towed. Auxiliary chain means 72 is releasably hooked beneath the vehicle, normally in the axle area thereof. A pair of generally parallel flexible belts 74 are secured to a cross piece 76 of frame 66 an extend upwardly, secured to a rigid cross bar 78. Flexible belts 74 wrap about the end of the towed vehicle to prevent damage thereto. Once the rear end sling assembly is secured to the vehicle as described, the vehicle is lifted by the boom assembly into towing position as shown in FIG. 6. A chain 80 is provided which attaches at its upper end to the eye support 82 on boom 34, and at its lower end 84 to the central eye support 86 on cross bar 78. In this fashion, the cross bar 78 and flexible belts 74 are releasably secured to the boom 34.

Figure 4:
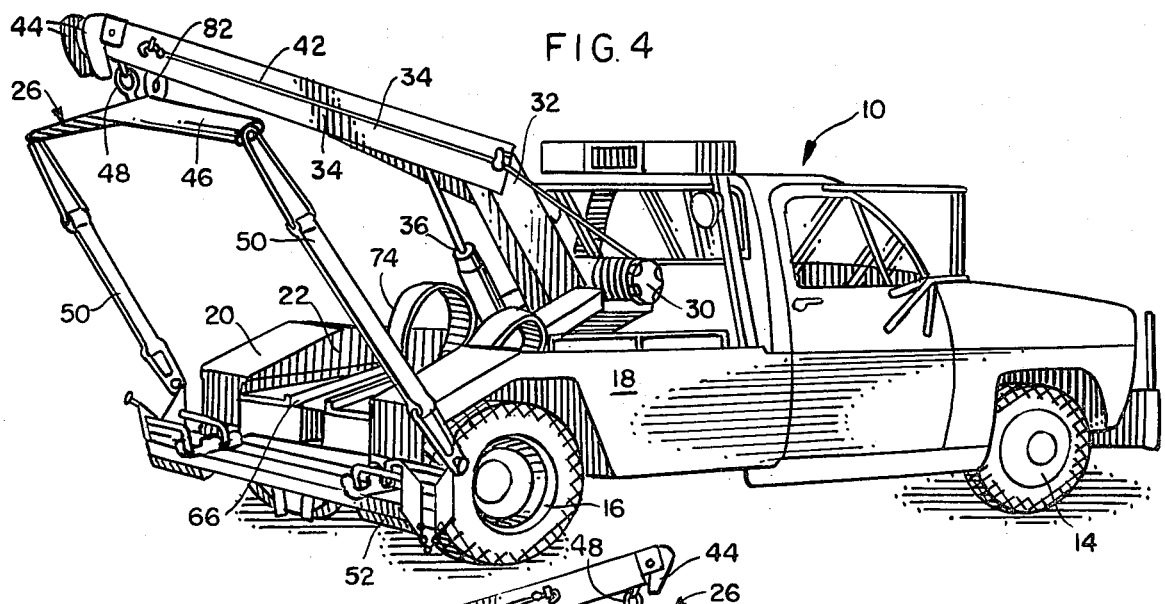
FIG. 4 is a rear perspective view similar to that of FIG. 1, but with the belt sling assembly folded in its storage position overlying the truck body.
Figure 7:
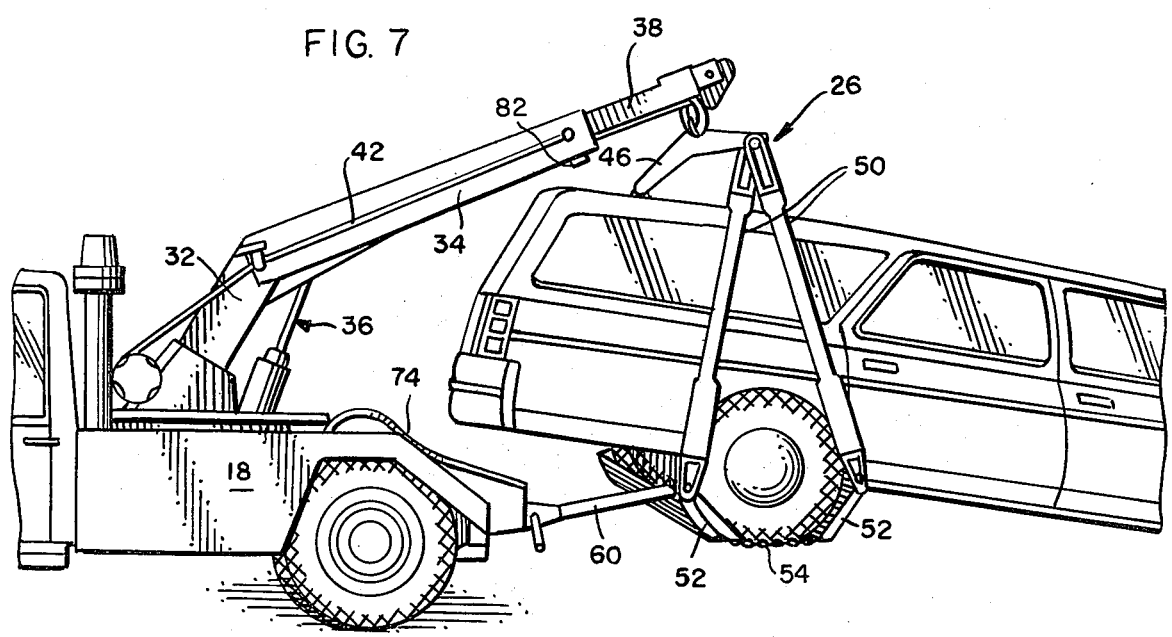
FIG. 7 is a fragmented view illustrating a station wagon in towing position, lifted at its rear wheels by the cradle sling assembly.

It can be seen in FIG. 4 that the entire belt sling assembly 28 can be pivoted upwardly to a storage position overlying the top of the rear body 18 of the tow truck and disposed in the recessed area 22 thereof, completely out of the way of boom assembly 24 and wheel lift sling assembly 26 so as not to interfere with independent operation thereof. This storage position of belt sling assembly 28 and the angular construction of boom assembly 24 are even more critical when utilizing the wheel lift sling assembly 26 to tow vehicles having a relative high profile, such as a station wagon towed from the rear as shown in FIG. 7. Since it is important to position the towed vehicle as close to the rear wheels of the tow truck as is possible, the increased clearance provided by the angled boom assembly 24 and stored belt sling assembly 28 is readily apparent.

Thus, it can be seen that a new and improved towing vehicle in the form of a tow truck has been provided for use and in combination with a novel boom assembly and winching and lifting apparatus. The boom assembly affords greater versatility, including winching of an immobilized vehicle from the front of the tow truck. The truck can utilize both a wheel lift sling assembly as well as a belt sling assembly for independent operation and vastly increased versatility, without either assembly interfering with the operation of the other, and without either assembly having to be removed from the truck during operation and use of the other sling assembly.

It will be understood that the invention may be embodied in other specific forms without departing from the spirit or central characteristics thereof. The present embodiments, therefor, are to be considered in all respects as illustrative and not restrictive, and the invention is not to be limited to the details given herein, but rather is to be defined by reference to the appended claims.

What is claimed is:

1. A towing and lifting apparatus, comprising:
   a vehicle having a rear body and a rear end;
   a boom mounted on said rear body and extending at least to the rear end of the vehicle;
   a belt sling assembly including a rigid portion and a flexible portion, said rigid portion having one end pivotally mounted at said rear end of the vehicle adjacent an upper surface of said rear body and the other end connected to said flexible portion, said belt sling assembly being connectable to said boom for the towing of another vehicle;
   a wheel lift sling assembly associated with said boom for the towing of another vehicle; and
   at least a rearward portion of said body being constructed with a low profile to accommodate pivotal movement of said belt sling assembly to a storage position overlying said rearward portion of said body to permit independent operation of said boom and wheel lift sling assembly.

2. The towing and lifting apparatus of claim 1 wherein said belt sling assembly rigid portion is positionable at least in part beneath a vehicle to be towed and said flexible portion is connected between said rigid portion and said boom and positionable about the front end of the towed vehicle during the towing operation.

3. The towing and lifting apparatus of claim 2 wherein said flexible portion of the belt sling assembly is releasable from the boom for movement with the rigid portion to said storage position.

4. The towing and lifting apparatus of claim 2 wherein said wheel lift sling assembly comprises a generally horizontal sling support means connected to said boom, flexible sling means connected to and depending from opposite ends of said sling support means; and wherein said rear body includes means for releasably securing said flexible sling means adjacent the rear end of said vehicle on opposite sides of said belt sling assembly so as not to interfere with the operation thereof.

5. The towing and lifting apparatus of claim 2 wherein said boom includes a boom assembly comprising a first boom portion pivotally mounted at one end to said rear body, and a second boom portion rigidly fixed to the opposite end of said first boom portion and extending at a downward angle relative thereto; the lengths of said boom portions and the location of said boom assembly on said rear body being such as to permit the free end of said second boom portion to travel through an arcuate path from an upper position suitable for towing a vehicle to a lower position behind said vehicle and at least below the undercarriage of the vehicle; and power means for pivotally moving said boom assembly.

6. The towing and lifting apparatus of claim 5 including a winching cable operatively associated with the free end of said second boom portion for extending forwardly beneath the vehicle for engaging another vehicle or the like to be towed or winched.

7. A towing and lifting apparatus, comprising:
   a vehicle having a rear body and a rear end;
   a boom mounted on said rear body and extending at least to the rear end of the vehicle;
   a belt sling assembly including a rigid portion and a flexible portion, said rigid portion having one end pivotally mounted at said rear end of the vehicle adjacent an upper surface of said rear body and the other end connected to said flexible portion, said belt sling assembly being connectable to said boom for the towing of another vehicle;

a wheel lift sling assembly including flexible sling means and rigid wheel lift means, said wheel lift sling assembly being associated with said boom for the towing of another vehicle;

at least a rearward portion of said body being constructed with a low profile to accommodate pivotal movement of said belt sling assembly to a storage position overlying said rearward portion of said body to permit independent operation of said boom and wheel lift sling assembly; and means for releasably securing said flexible sling means and said rigid wheel lift means to the rear end of the vehicle in a storage position which permits independent operation of said belt sling assembly.

8. The lifting and towing apparatus of claim 7 wherein said securing means are positioned below the point where said belt sling means is pivotally mounted at the rear end of the vehicle.

* * * * *